United States Patent
Gagneraud et al.

(10) Patent No.: US 7,555,642 B2
(45) Date of Patent: Jun. 30, 2009

(54) MEDIA TRANSFER SYSTEM AND METHOD

(75) Inventors: Eric Gagneraud, Houston, TX (US); Eric Owhadi, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 489 days.

(21) Appl. No.: 11/412,508

(22) Filed: Apr. 27, 2006

(65) Prior Publication Data

US 2007/0255938 A1    Nov. 1, 2007

(51) Int. Cl.
G06F 9/00    (2006.01)
(52) U.S. Cl. .................. 713/1; 713/100; 710/5
(58) Field of Classification Search ........ 713/1, 713/100; 710/5
See application file for complete search history.

(56) References Cited

U.S. PATENT DOCUMENTS

| | | | |
|---|---|---|---|
| 5,875,312 A | 2/1999 | Walsh et al. | |
| 6,631,469 B1* | 10/2003 | Silvester | 713/2 |
| 6,832,373 B2* | 12/2004 | O'Neill | 717/171 |
| 6,839,836 B2 | 1/2005 | Cole et al. | |
| 6,981,161 B2* | 12/2005 | Koo | 713/310 |
| 7,039,742 B1* | 5/2006 | Lada et al. | 710/301 |
| 7,139,894 B1* | 11/2006 | Mensching et al. | 711/170 |
| 7,269,746 B1* | 9/2007 | Lada et al. | 713/300 |
| 7,380,141 B2* | 5/2008 | Seol | 713/300 |
| 7,380,148 B2* | 5/2008 | Montero et al. | 713/324 |
| 2002/0152372 A1 | 10/2002 | Cole et al. | |
| 2003/0182414 A1* | 9/2003 | O'Neill | 709/223 |
| 2007/0073766 A1* | 3/2007 | Porter | 707/103 R |

* cited by examiner

Primary Examiner—Chun Cao

(57) ABSTRACT

A media transfer system comprises a computer device having a quick-transfer media interface and a reduced operating system executable in response to actuation of the quick-transfer media interface, the reduced operating system configured to automatically launch a media transfer module to facilitate transfer media content from a media card to the computer device.

21 Claims, 3 Drawing Sheets

MEDIA TRANSFER SYSTEM AND METHOD

BACKGROUND OF THE INVENTION

Digital cameras and other types of digital imaging devices store media content on a memory card (e.g., a memory stick (MS) media card, a secure digital (SD) media card, an extreme digital (xD) media card, etc.). Lately, computer devices are being configured having memory card slots to receive the memory card therein to facilitate transfer of the media content on the media card to the computer system (e.g., so that space may be freed up on the media card for additional content). However, transferring the media content in this fashion is time-consuming. For example, a user must turn on the computer system and wait for the computer system to boot, locate an applicable software application to facilitate the media transfer, and even specify where (e.g., what directory or file space) the user would like the media stored on the computer system.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
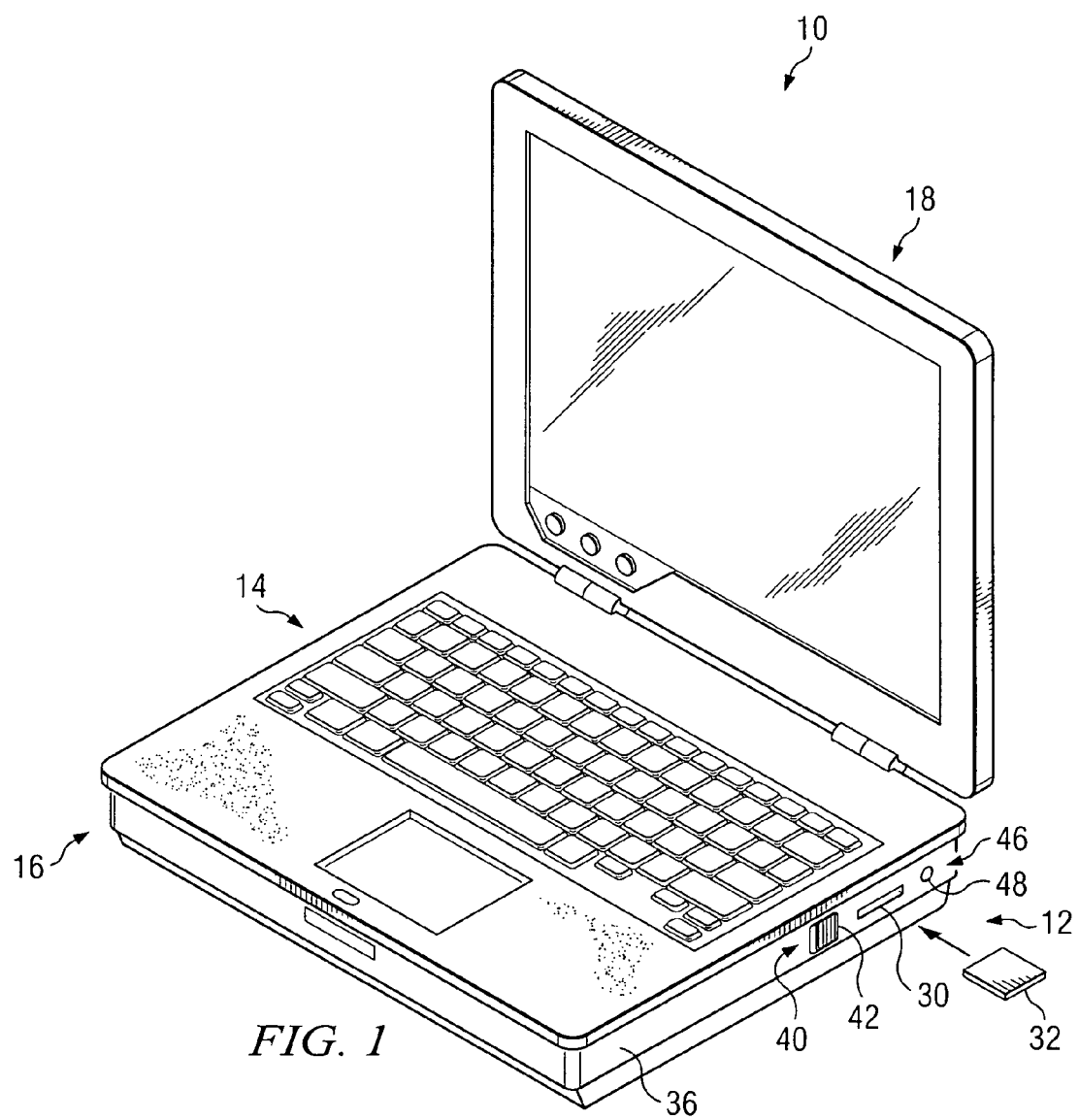
FIG. 1 is a diagram illustrating a computer device in which an embodiment of a media transfer system in accordance with the present invention
Figure 2:
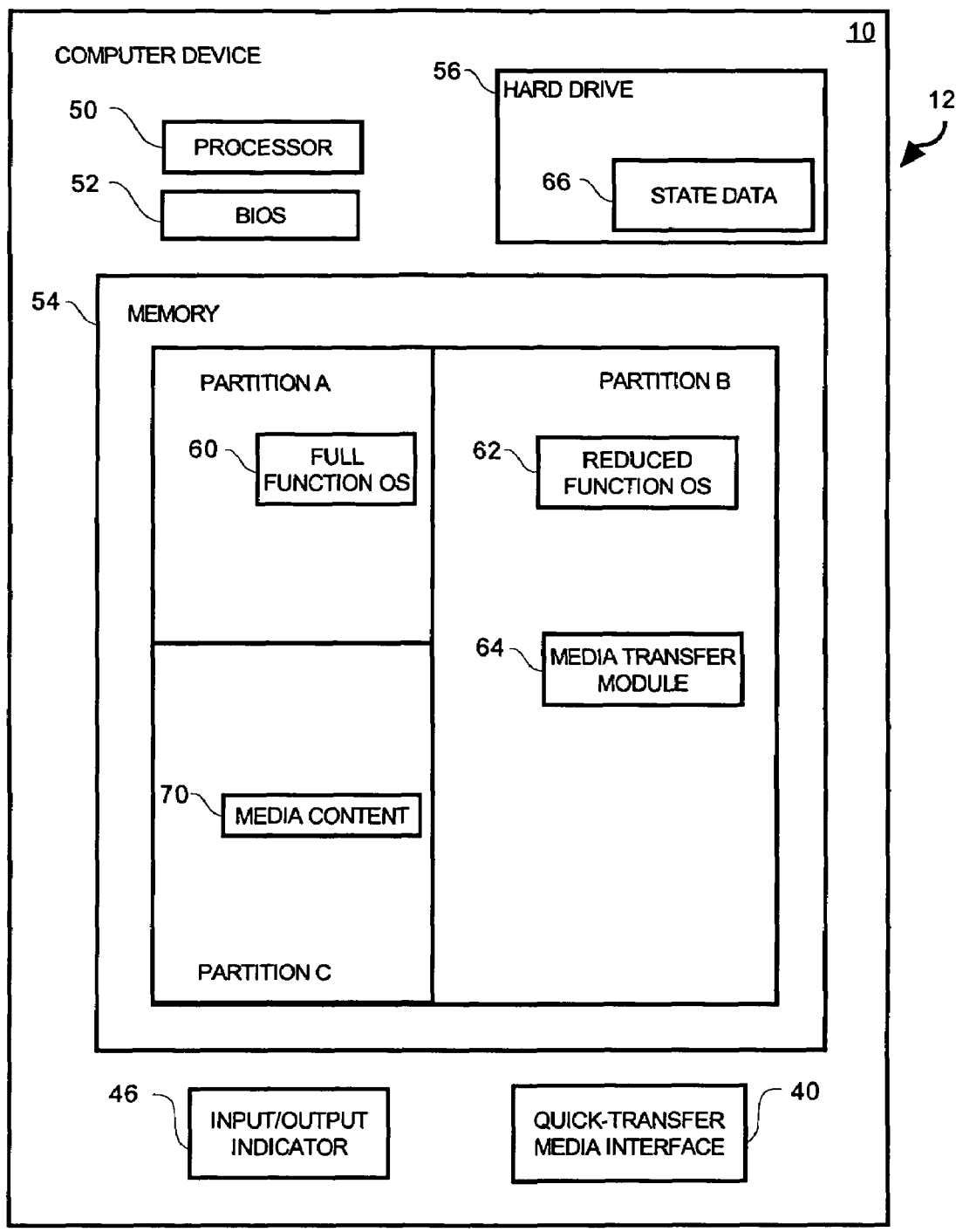
FIG. 2 is a block diagram illustrating an embodiment of a media transfer system in accordance with the present invention.
Figure 3:
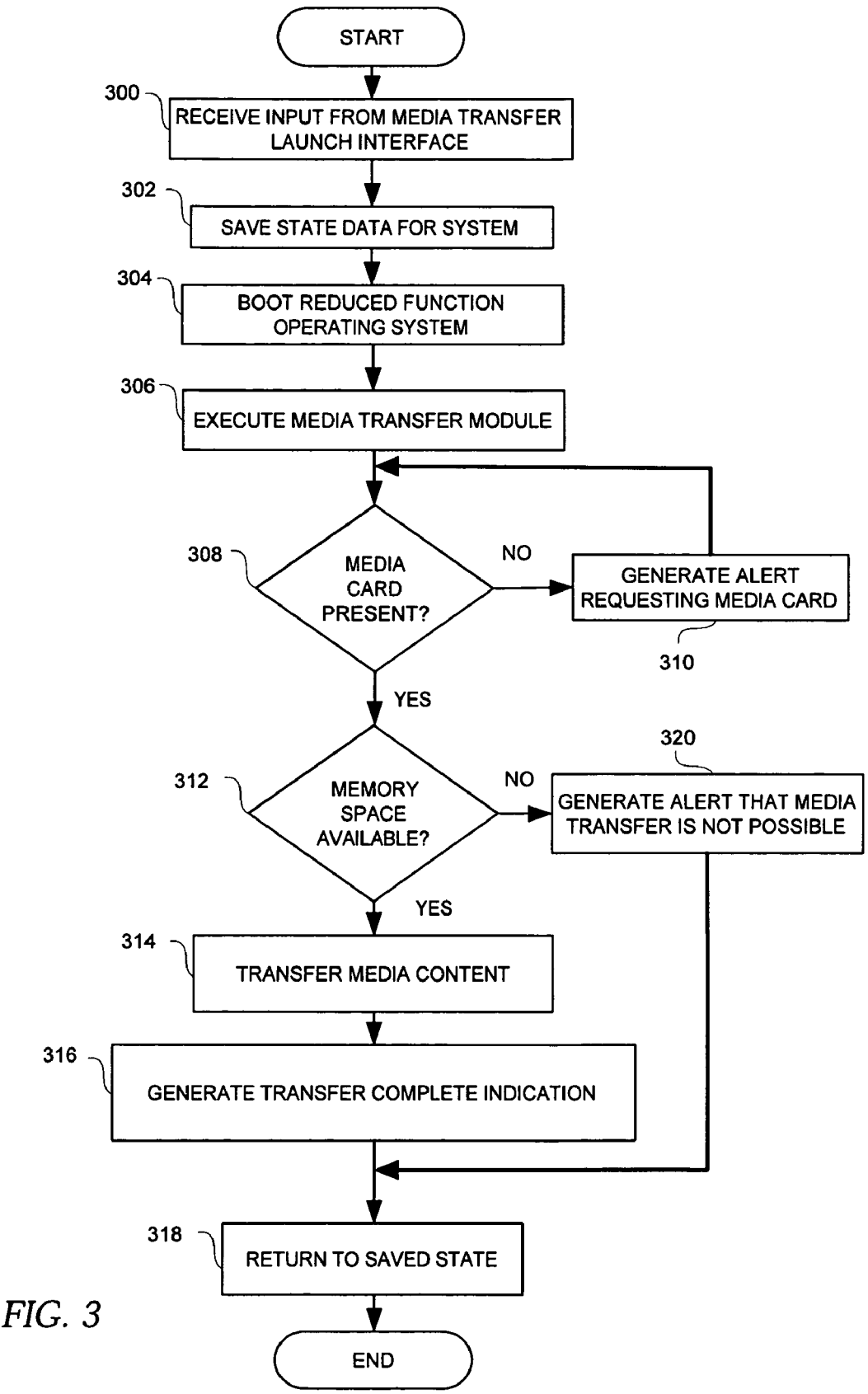
FIG. 3 is a flow diagram illustrating an embodiment of a media transfer method in accordance with the present invention.

The preferred embodiments of the present invention and the advantages thereof are best understood by referring to FIGS. 1-3 of the drawings, like numerals being used for like and corresponding parts of the various drawings.

FIG. 1 is a diagram illustrating a computer device 10 in which an embodiment of a media transfer system 12 is employed to advantage in accordance with the present invention. In the embodiment illustrated in FIG. 1, computer device 10 comprises a notebook computer 14 having a base member 16 and a display member 18 rotatably coupled to base member 16. In the embodiment illustrated in FIG. 1, display member 18 comprises a display screen 20 for visually displaying content associated with notebook computer 14. It should be understood that system 12 may be incorporated and/or otherwise used with other types of computer devices including, but not limited to, a desktop computer, tablet computer, or other type of portable or non-portable computing device.

In the embodiment illustrated in FIG. 1, computer device 10 comprises a media card slot 30 for receiving a media card 32 therein. Media card 32 may comprise any type of media or memory card such as, but not limited to, a memory stick (MS) media card, a secure digital (SD) media card and an extreme digital (xD) media card. In the embodiment illustrated in FIG. 1, media card slot 30 is located on a side portion 36 of base member 16. However, it should be understood that media card slot 30 may be otherwise located on computer device 10.

System 12 comprises a quick-transfer media interface 40 for quickly and automatically downloading and/or transferring media content from media card 32 to computer device 10.

In one embodiment of the present invention, quick-transfer media interface 40 comprises an actuatable and/or depressible button 42. However, it should be understood that quick-transfer media interface 40 may comprise other types of elements such as, but not limited to, a pressure-sensitive contact element, thermally-sensitive contact element, slidable switch or otherwise. Further, in some embodiments of the present invention, quick-transfer media interface 40 is disposed in and/or is otherwise configured with media card slot 30 (e.g., actuatable in response to insertion of media card 32 into media card slot 30). In the embodiment illustrated in FIG. 1, interface 40 is located on side portion 36 of base member 16 to facilitate access to interface 40 by a user of notebook computer 14 while notebook computer 14 is in a closed position. However, it should be understood that interface 40 may be otherwise located on computer device 10.

In the embodiment illustrated in FIG. 1, system 12 also comprises an input/output indicator 46 for indicating a status of media content transfer from media card 32 to computer device 10. For example, in FIG. 1, input/output indicator 46 comprises at least one light emitting diode (LED) 48 for providing a visual indication of a status of media transfer. For example, in some embodiments of the present invention, LED 48 comprises a multi-color LED such that different colors of LED 48 signify different status conditions of the media transfer (e.g., red if media content transfer is not possible, yellow while media content is being transferred, and green when media content transfer is complete). It should also be understood that multiple and/or different color LEDs may be used to indicate different status conditions of the media content transfer. Further, it should be understood that different light conditions of LED 48 may be used to indicate different status conditions associated with the media transfer (e.g., fast blinking condition indicating media transfer not possible, slow blinking condition indicating media transfer in process, continuously lit indicating transfer complete, etc.). However, it should be understood that other types of elements may be used to provide a visual indication of a status of the media transfer. It should also be understood that the status of the media transfer may be otherwise presented to a user of computer device 10 (e.g., an audio indication and/or a visual indication on display screen 20). In the embodiment illustrated in FIG. 1, input/output indicator 46 is located on side portion 36 of base member 16 to facilitate a visual indication of the status of the media transfer when notebook computer 14 is in a closed position. However, it should be understood that input/output indicator 46 may be otherwise located on computer device 10.

In operation, in response to actuation of interface 40, a reduced function operating system of computer device 10 is launched (e.g., an operating system providing a limited number of resources and/or functions instead of a normal or full function operating system). Preferably, the reduced function operating system boots and/or otherwise loads in less time than required for booting and/or loading of a full function operating system, thereby facilitating quick transfer of media content from media card 32 to computer device 10.

FIG. 2 is a diagram illustrating an embodiment of system 12 incorporated in computer device 10 in accordance with the present invention. In the embodiment illustrated in FIG. 2, system 12 comprises a processor 50, a basic input/output system (BIOS) 52, input/output indicator 46, quick-transfer media interface 40, a memory 54 and a hard drive 56. In the embodiment illustrated in FIG. 2, memory 54 comprises a shared memory space having a full function operating system (OS) 60 is disposed in a partition A of memory 54, and a reduced function OS 62 is disposed in a partition B of memory 54. As discussed above, reduced function OS 62 is preferably an operating system providing limited and/or reduced functions to facilitate booting and or loading thereof in less time than would be required to boot and/or load full function OS 60. In the embodiment illustrated in FIG. 2, system 12 also comprises a media transfer module 64 and state data 66 disposed within partition B of memory 54. Media transfer module 64 may comprise hardware, software, firmware or a combination thereof. Media transfer module 64 is executed and/or otherwise activated by reduced function OS 62 to facilitate transfer of media content from media card 32 (FIG. 1) to computer device 10. For example, media transfer module 64 is preferably used to determine a size or capacity of memory 54 needed to store the content disposed on media card 32, verify that media card 32 is present and/or otherwise loaded in media card slot 30 (FIG. 1) and provide an indication of a status of the media transfer (e.g., via input/output indicator 46).

In operation, in response to actuation of quick-transfer media interface 40, BIOS 52 automatically launches and/or causes to be launched reduced function OS 62. Further, BIOS 52 automatically determines and stores state data 66 associated with computer device 10 in response to actuation of quick-transfer media interface 40. For example, computer device 10 may be in a sleep and/or suspend state when quick-transfer media interface 40 is actuated. State data 66 enables computer device 10 to be returned to its previous state condition (e.g., after media content transfer is complete or if media content transfer is not possible (e.g., insufficient memory 54 space or no media card 32 coupled to computer system 10)). Thus, in operation, BIOS 52 backs up an amount of data from memory 54 to hard drive 56 (e.g., state data 66) to enable computer device 10 to be returned to its previous state (e.g. an amount of memory 54 needed to execute reduced function OS 62). The state data 66 is thereafter used to return computer device 10 to its previous state. However, it should be understood that other methods and/or elements may be used to save state information of device 10 and return device 10 to its previous state.

Preferably, reduced function OS 62 automatically launches and/or otherwise activates media transfer module 64 to facilitate transfer of media content from media card 32 to memory 54. In some embodiments of the present invention, media transfer module 64 automatically determines whether media card 32 is coupled to computer device 10 (e.g., whether media card 32 is present within media card slot 30 (FIG. 1). Further, in some embodiments of the present invention, media transfer module 64 accesses media card 32 to determine the quantity or size of media content thereon to be transferred to memory 54 to verify whether sufficient memory 54 exists for the media content transfer. If media card 32 is disposed within media slot 30 and sufficient memory capacity exists in memory 54, media transfer module 64 automatically transfers and/or otherwise downloads media content from media card 32 and stores the media content in memory 54 as media content 70. In FIG. 2, media content 70 is illustrated as being disposed in a partition C of memory 54. However, it should be understood that media content 70 may be otherwise stored in memory 54 or elsewhere.

Preferably, media transfer module 64 is configured to automatically create a file directory in memory 54 for storing media content 70 thereunder. The file directory may be automatically and/or randomly created by media transfer module 64 or, preferably, created based on previous user input. For example, in some embodiments of the present invention, media transfer module 64 is configured to enable a user to input a file directory name to be used for a quick-transfer of media content (e.g., during a previous full function OS 60 session). In some embodiments of the present invention, media transfer module 64 is configured to enable a user to input a file directory name contemporaneously with the current media content transfer (e.g., during the current reduced function OS 62 session).

In some embodiments of the present invention, media transfer module 64 interfaces with input/output indicator 46 to indicate a status of the media content transfer from media card 32 to computer device 10. For example, as described above, input/output indicator 46 may comprise one or more LEDs 48 or other types of indicator elements for indicating a status of media content transfer. Thus, for example, if media transfer module 64 detects that media card 32 is absent from media card slot 30, media transfer module 64 interfaces with input/output indicator 46 to indicate to a user that media card 32 is absent from media card slot 30 and/or request insertion of media card slot 32 into media card slot 30. In some embodiments of the present invention, media transfer module 64 also interfaces with input/output indicator 46 to provide an indication of whether sufficient space in memory 54 is available for storing media content 70 therein. For example, if the size of media content to be transferred from media card 32 is greater than the available capacity of memory 54, media transfer module 64 causes input/output indicator 46 to indicate to a user that insufficient memory exists for the media transfer.

In some embodiments of the present invention, system 12 is configured to automatically return computer device 10 to a previous state (e.g., the state detected and/or stored in response to actuation of quick-transfer media interface 40). For example, after transfer of media content from media card 32 to computer device 10 is completed, or in response to detecting that insufficient memory 54 space exists for the media transfer or after a predetermined time period has elapsed where no media card 32 is detected within media card slot 30, reduced function OS 62 and/or BIOS 52 automatically returns computer device 10 to a previous state as indicated by state data 66. Thus, for example, if computer device 10 was in a particular sleep and/or suspend state when actuation of quick-transfer media interface 40 was actuated, computer device 10 automatically returns computer device 10 to the particular sleep and/or suspend state.

FIG. 3 is a flow diagram illustrating an embodiment of a media transfer method in accordance with the present invention. The method begins at block 300, where actuation and/or input of quick-transfer media interface 40 is detected. At block 302, BIOS 52 saves state data 66 associated with a present state of computer device 10. At block 304, BIOS 52 boots reduced function OS 62. At block 306, reduced function OS 62 loads and/or otherwise executes media transfer module 64.

At decisional block 308, a determination is made whether media card 32 is present and/or fully inserted within media card slot 30 (FIG. 1) (e.g., where actuation of quick-transfer media interface 40 is not based on insertion or the presence of media card 32 in media card slot 30). If media card 32 is absent from or not fully inserted into media card slot 30, the method proceeds to block 310, where media transfer module 64 interfaces with input/output-indicator 46 to provide a visual and/or audio indication that media card 32 is absent from or not fully inserted into media card slot 30 and/or to request insertion of media card 32 into media card slot 30. The method may continue to indicate the absence of media card 32 from media card slot 30 and/or, after a predetermined time period, automatically return computer device to a previous state (e.g., as indicated by state data 66). If it is determined at decisional block 308 that media card 32 is present within media card slot 30, the method proceeds to decisional block 312, where media transfer module 64 determines whether sufficient space in memory 54 is available for a transfer of the media content from media card 32 to memory 54. If insufficient memory space is available within memory 54, the method proceeds to block 320, where media transfer module 64 interfaces with input/output indictor 46 to provide an indication or alert that media content transfer is not possible.

If it is determined at decisional block 312 that sufficient space within memory 54 is available for a transfer of the media content from media card 32, the method proceeds to block 314, where media transfer module 64 automatically initiates and/or transfers media content from media card 32 to memory 54. At block 316, media transfer module 64 interfaces with input/output indicator 46 to indicate a status of the media content transfer (e.g., indicating media content transfer in process and/or media content transfer complete). At block 318, computer system 10 is returned to the state stored and/or saved as state data 66 in response to actuation of quick-transfer media interface 40.

Thus, embodiments of the present invention enable a quick transfer of media content from media card 32 to computer device 10. Further, embodiments of the present invention enable the transfer of media content from media card 32 to a notebook computer 14 while the notebook computer 14 is in a closed position.

What is claimed is:

1. A media transfer system, comprising:
    a computer device having a quick-transfer media interface being a switch positioned on the computer device;
    a reduced operating system executable in response to actuation of the switch, the reduced operating system configured to automatically execute a media transfer module to facilitate transfer of media content from a media card connected to the computer device to the computer device; and
    a basic input/output system (BIOS) stored in the computer device and configured to save state data associated with a state of the computer device in response to the actuation of the switch, the state data being saved prior to transferring the media content from the media card;
    where the basis input/output system is further configured to restore the computer device to the state using the state data after the media content is transferred.

2. The system of claim 1, wherein the media transfer module is configured to automatically verify available memory space on the computer device for the media content.

3. The system of claim 1, further comprising an input/output indicator configured to indicate a status of the media content transfer.

4. The system of claim 1, wherein actuation of the switch of the quick-transfer media interface comprises detecting insertion of the media card into a media card slot.

5. The system of claim 1, wherein the computer device comprises a notebook computer.

6. The system of claim 5, wherein the quick-transfer media interface is accessible while the notebook computer is in a closed position.

7. The system of claim 1, further comprising at least one light emitting diode (LED) configured to indicate a status of the media content transfer.

8. The system of claim 7, wherein the at least one LED is visible while the computer device is in a closed position.

9. The system of claim 1, wherein the media transfer module is configured to automatically transfer the media content from the media card to the computer device.

10. The system of claim 1, wherein the media transfer module is configured to indicate a status of media content transfer from the media card to the computer device.

11. The system of claim 10, wherein the status comprises at least one of an indication of a transfer complete, a transfer in process, and a transfer not possible.

12. A media transfer method, comprising:
    receiving an indication of actuation of a switch to activate a quick-transfer media interface of a computer device; and
    executing a reduced operating system in response to the actuation, the reduced operating system configured to automatically launch a media transfer module to facilitate transfer of media content from a media card to the computer device;
    saving state data in a memory in response to the actuation of the switch, the saving being performed prior to transferring media content from the media card, where the state data is represents a state of the computer device;
    transferring the media content from the media card to the computer device; and
    after completion of the transferring, returning the computer device to the state prior to the transferring using the state data from the memory.

13. The method of claim 12, further comprising verifying available memory space of the computer device for the media content.

14. The method of claim 12, further comprising automatically transferring the media content from the media card to the computer device.

15. The method of claim 12, further comprising disposing the quick-transfer media interface on a notebook computer device.

16. The method of claim 12, where receiving the indication of actuation of the switch to activate the quick-transfer media interface causes the computer device to execute the reduced operating system from a sleep or off state, or while a display lid of the computer device is in a closed position.

17. The method of claim 12, further comprising providing a light emitting diode (LED) for indicating a status of the transfer.

18. The method of claim 12, further comprising indicating a status of media transfer from the media card to the computer device.

19. The method of claim 12, wherein receiving an indication of actuation comprises receiving the media card in a media card slot.

20. A media transfer system, comprising:
    means for receiving an indication of actuation of a quick-transfer media interface of a computer device;
    means executing a reduced operating system in response to the actuation, the reduced operating system configured to automatically launch a media transfer module and transfer media content from a media card to the computer device; and
    means, stored in the computer device, for saving state data associated with a state of the computer device in response to the actuation of the quick-transfer media interface, the state data being saved prior to transferring the media content from the media card;
    where the means for saving further includes means for returning the computer device to the state using the state data after the media content is transferred.

21. The system of claim 20, where the means for receiving comprises a switch externally positioned on the computer device and connected to generate the indication of actuation.

* * * * *

UNITED STATES PATENT AND TRADEMARK OFFICE
CERTIFICATE OF CORRECTION

| | | |
|---|---|---|
| PATENT NO. | : 7,555,642 B2 | |
| APPLICATION NO. | : 11/412508 | |
| DATED | : June 30, 2009 | |
| INVENTOR(S) | : Eric Gagneraud et al. | |

It is certified that error appears in the above-identified patent and that said Letters Patent is hereby corrected as shown below:

In column 5, line 35, in Claim 1, delete "basis" and insert -- basic --, therefor.

In column 6, line 13, in Claim 12, after "data" delete "is".

Signed and Sealed this

Nineteenth Day of January, 2010

David J. Kappos
*Director of the United States Patent and Trademark Office*